United States Patent
Tanba et al.

(10) Patent No.: US 9,552,170 B2
(45) Date of Patent: Jan. 24, 2017

(54) MEMORY MANAGING APPARATUS AND IMAGE PROCESSING APPARATUS

(71) Applicant: KYOCERA Document Solutions Inc.

(72) Inventors: Masato Tanba, Osaka (JP); Takashi Toyoda, Osaka (JP)

(73) Assignee: Kyocera Document Solutions, Inc. (JP)

( * ) Notice: Subject to any disclaimer, the term of this patent is extended or adjusted under 35 U.S.C. 154(b) by 131 days.

(21) Appl. No.: 14/370,606

(22) PCT Filed: Jan. 23, 2013

(86) PCT No.: PCT/JP2013/051272
§ 371 (c)(1),
(2) Date: Jul. 3, 2014

(87) PCT Pub. No.: WO2013/111769
PCT Pub. Date: Aug. 1, 2013

(65) Prior Publication Data
US 2015/0012720 A1    Jan. 8, 2015

(30) Foreign Application Priority Data

Jan. 27, 2012 (JP) ................................ 2012-015983

(51) Int. Cl.
*G06F 12/10* (2016.01)
*G06F 3/06* (2006.01)
*G06F 12/08* (2016.01)

(52) U.S. Cl.
CPC .......... *G06F 3/0644* (2013.01); *G06F 3/0604* (2013.01); *G06F 3/0665* (2013.01); *G06F 3/0671* (2013.01); *G06F 12/10* (2013.01); *G06F 12/1009* (2013.01); *G06F 2003/0697* (2013.01)

(58) Field of Classification Search
CPC ........................................................ G06F 12/10
USPC ........................................................ 711/171
See application file for complete search history.

(56) References Cited

U.S. PATENT DOCUMENTS

| | | | |
|---|---|---|---|
| 2010/0161929 A1* | 6/2010 | Nation | G06F 9/5016 711/170 |
| 2010/0220359 A1* | 9/2010 | Ohgishi | G06F 9/5016 358/1.16 |
| 2010/0262802 A1* | 10/2010 | Goebel | G06F 3/0608 711/166 |

(Continued)

FOREIGN PATENT DOCUMENTS

JP    2001-213011    8/2001

*Primary Examiner* — Sanjiv Shah
*Assistant Examiner* — Gautam Sain

(57) ABSTRACT

The memory area managing unit 22 (a) sets a protect flag to each virtual area allocated in a virtual memory space, the protect flag indicating whether a use of the virtual area has been finished or not, and (b) when a part or all of a first virtual area would overlap another second virtual area due to expansion or movement of the first virtual area, allows the expansion or the movement of the first virtual area accompanying with overlapping the second virtual area, if the protect flag of the second virtual area indicates that a use of the second virtual area has been finished. If the expansion or the movement is allowed, the memory pool managing unit 23 adds a physical area in a physical memory space corresponding to an overlapping part of the first and second virtual areas into a memory pool to map to another virtual area.

2 Claims, 9 Drawing Sheets

(56) References Cited

U.S. PATENT DOCUMENTS

2011/0107052 A1\* 5/2011 Narayanasamy ..... G06F 3/0608
　　　　　　　　　　　　　　　　　　　　711/171

\* cited by examiner

FIG. 4

| No. | SIZE | TOP PHYSICAL ADDRESS |
|-----|------|----------------------|
| 1   | 100  | 0x00001000           |
| 2   | 240  | 0x00aaa000           |
| ⋮   |      |                      |

MEMORY MANAGING APPARATUS AND IMAGE PROCESSING APPARATUS

TECHNICAL FIELD

The present invention relates to a memory managing apparatus and an image processing apparatus.

BACKGROUND ART

Recently, in an image forming apparatus such as a printer or a multi function peripheral, an operating system is implemented and memory management in a virtual memory system is carried out by the operating system (see PATENT LITERATURE #1, for example).

CITATION LIST

Patent Literature

PATENT LITERATURE #1: Japanese Patent Application Publication No. 2001-213011.

SUMMARY OF INVENTION

Technical Problem

The size of the virtual memory space can be set by the operating system. However, a large size of the virtual memory space results in a large size of a management area managed by the operating system, and therefore, a small size of the virtual memory space is favorable.

In the virtual memory space, when expansion or movement of an allocated virtual area requires to allocate another virtual memory at the place of another allocated virtual memory area, it is necessary to displace this "another allocated virtual memory area" to another place. In this case, it is necessary to remap this "another allocated virtual memory area" to a physical memory. Further, in this time, if a physical area corresponding this virtual area also moves in a physical memory space, it is necessary to perform memory copy of this "another allocated virtual memory area" to its destination. This often occurs when a free area is small in the virtual memory space.

The present invention has been made in view of the aforementioned problem, and it is an object of the present invention to obtain a memory managing apparatus and an image processing apparatus capable of reducing the frequency of remapping (or remapping and memory copy) due to expansion or movement of an allocated virtual area.

Solution to Problem

A memory managing apparatus according to an aspect of the present invention includes a memory area managing unit and a memory pool managing unit. The memory area managing unit (a) sets a flag to each virtual area allocated in a virtual memory space, the flag indicating that a use of the virtual area has been finished or not, and (b) when a part or all of a first virtual area would overlap another second virtual area due to expansion or movement of the first virtual area, allows the expansion or the movement of the first virtual area accompanying with overlapping the second virtual area if the flag of the second virtual area indicates that a use of the second virtual area has been finished, and does not allow the expansion or the movement of the first virtual area accompanying with overlapping the second virtual area if the flag of the second virtual area does not indicate that a use of the second virtual area has been finished. The memory pool managing unit adds a physical area in a physical memory space corresponding to an overlapping part of the first and the second virtual areas into a memory pool in order to map the physical area to another virtual area, if the expansion or the movement of the first virtual area accompanying with overlapping the second virtual area is allowed by the memory area managing unit.

Consequently, it is possible to reduce the frequency of remapping (or remapping and memory copy) due to expansion or movement of an allocated virtual area. In addition, usage efficiency of the physical memory space increases.

An image processing apparatus according to an aspect of the present invention includes a memory managing apparatus, a memory managed by the memory managing apparatus, and an application that performs image processing and stores image data in the memory in the image processing. This memory managing apparatus includes a memory area managing unit and a memory pool managing unit. The memory area managing unit (a) sets a flag to each virtual area allocated in a virtual memory space, the flag indicating that a use of the virtual area has been finished or not, and (b) when a part or all of a first virtual area would overlap another second virtual area due to expansion or movement of the first virtual area, allows the expansion or the movement of the first virtual area accompanying with overlapping the second virtual area if the flag of the second virtual area indicates that a use of the second virtual area has been finished, and does not allow the expansion or the movement of the first virtual area accompanying with overlapping the second virtual area if the flag of the second virtual area does not indicate that a use of the second virtual area has been finished. The memory pool managing unit adds a physical area in a physical memory space corresponding to an overlapping part of the first and the second virtual areas into a memory pool in order to map the physical area to another virtual area, if the expansion or the movement of the first virtual area accompanying with overlapping the second virtual area is allowed by the memory area managing unit.

Consequently, it is possible to reduce the frequency of remapping (or remapping and memory copy) due to expansion or movement of an allocated virtual area in a memory used for image processing. In addition, usage efficiency of the physical memory space increases.

Advantageous Effect of Invention

The present invention enables to reduce the frequency of remapping (or remapping and memory copy) due to expansion or movement of an allocated virtual area in a memory managing apparatus or the like.

These and other objects, features and advantages of the present invention will become more apparent upon reading of the following detailed description along with the accompanied drawings.

BRIEF DESCRIPTION OF DRAWINGS

FIG. 4 shows a diagram that indicates an example of a memory pool table managed by a memory pool managing unit in FIG. 1;

DESCRIPTION OF EMBODIMENTS

Hereinafter, an embodiment of the present invention will be explained with reference to drawings.

Figure 1:
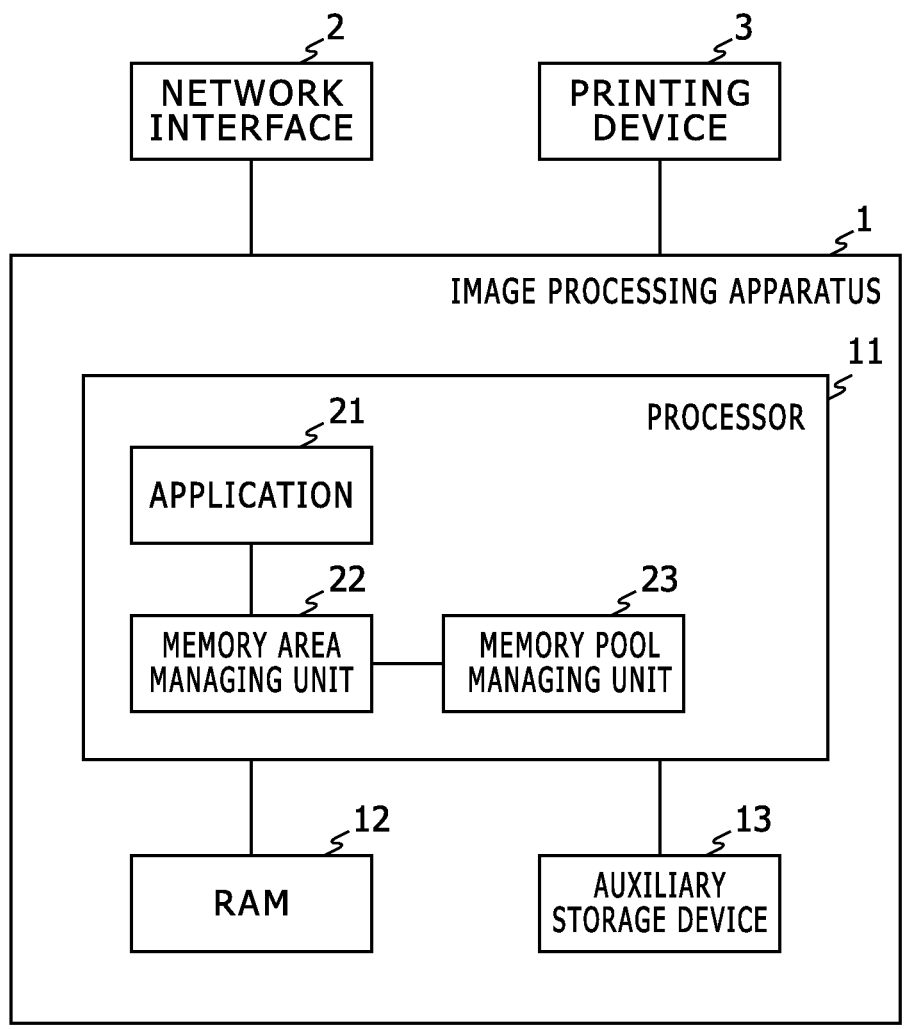
FIG. 1 shows a block diagram that indicates a configuration of an image forming apparatus that includes an image processing apparatus according to an embodiment of the present invention.

FIG. 1 shows a block diagram that indicates a configuration of an image forming apparatus that includes an image processing apparatus according to an embodiment of the present invention. The image forming apparatus shown in FIG. 1 is a printer, a multi function peripheral or the like, and includes an image processing apparatus 1, a network interface 2, and a printing device 3.

The image processing apparatus 1 is connected to the network interface 2, the printing device 3 and the like, and executes a print job on the basis of a print request. The image processing apparatus 1 is configured as a computer, ASIC (Application Specific Integrated Circuit), and/or the like. The network interface 2 is a communication device that performs communication through a network with an unshown host device. For example, the network interface 2 receives print data described in a page description language as a print request from an unshown host device. The printing device 3 is provided print image data from the image processing apparatus 1, performs sorts of processes (e.g. half toning) for the print image data, and performs printing on the basis of the processed data.

This image processing apparatus 1 include a processor 11, a RAM (Random Access Memory) 12, and an auxiliary storage device 13.

The processor 11 includes a CPU (Central Processing Unit), an ASIC or the like, and embodies processing units that perform sorts of processes. For example, the processor 11 loads programs of an operating system and an application stored in the auxiliary storage device 13 to the RAM 12, and executes the programs. The RAM 12 is a volatile storage device that temporarily stores sorts of data related to a process performed by the processor 11. The auxiliary storage device 13 is a non volatile storage device that has stored sorts of data and a program executed by the CPU in the processor 11. As the auxiliary storage device 13, a ROM (Read Only Memory), a flash memory, a hard disc drive or the like is used.

In this image processing apparatus 1, memory management is performed by the operating system using a virtual memory system. Further, in the processor 11, an application 21, a memory area managing unit 22, and a memory pool managing unit 23 are embodied. Thus, the processor 11 acts as a memory managing apparatus that manages the RAM 12.

The application 21 is a processing unit that performs image processing for image data of a document to be printed. The application 21 allocates memory areas (i.e. memory areas in a virtual memory space, referred as virtual areas hereinafter) in the RAM 12 required for the image processing and performs the image processing using the virtual area.

The memory area managing unit 22 performs allocation (including mapping it to a physical area), changing and the like of a virtual area in accordance with a request from the application 21. Further, when receiving a request from the application 21 for data reading or data writing with a virtual address, the memory area managing unit 22 performs conversion from the virtual address to a physical address.

Furthermore, the memory area managing unit 22 sets a protect flag to each virtual area allocated in the virtual memory space. The protect flag indicates whether a use of the virtual area has been finished or not. Furthermore, when a part or all of a first virtual area would overlap another second virtual area due to expansion or movement of the first virtual area, if the protect flag of the second virtual area indicates that a use of the second virtual area has been finished, the memory area managing unit 22 allows the expansion or the movement of the first virtual area accompanying with overlapping the second virtual area.

When a part or all of a first virtual area would overlap another second virtual area due to expansion or movement of the first virtual area, if the protect flag of the second virtual area does not indicate that a use of the second virtual area has been finished, the memory area managing unit 22 does not allow the expansion or the movement of the first virtual area accompanying with overlapping the second virtual area.

It should be noted that the memory area managing unit 22 sets a protect flag per a unit of its memory management. For example, the memory area managing unit 22 manages the virtual memory space and the physical memory space using a paging system, and sets the protect flag to each page in the paging system. In such a case, although there are plural protect flags in one virtual area when one virtual area allocated as one block consists of plural pages, since the protect flags of all pages that the virtual area consists of have a same value, by referring to whichever of the protect flags, it is possible to determine whether a use of the virtual area has been finished or not.

If the expansion or the movement of the first virtual area accompanying with overlapping the second virtual area is allowed by the memory area managing unit 22, the memory pool managing unit 23 adds a physical area in a physical memory space corresponding to an overlapping part of the first and the second virtual areas into a memory pool in order to map the physical area to another virtual area.

In this embodiment, the memory area managing unit 22 selects a physical area having a size either equal to or larger than a size of the aforementioned another virtual area among physical areas added in the memory pool, and maps all or a part of the selected physical area to the aforementioned another virtual area. If a physical area having a size larger than a size of the aforementioned another virtual area is selected, the memory pool managing unit 23 keeps a residual part of the selected physical area after mapping to the aforementioned another virtual area in the memory pool.

Further, in this embodiment, the memory pool managing unit 23 holds either a top physical address and a size or a top physical address and an end physical address of a physical area in the memory pool, and selects the physical area having a size either equal to or larger than a size of the aforementioned another virtual area on the basis of either the top physical address and the size or the top physical address and the end physical address.

The following part explains a behavior of the aforementioned image processing apparatus. Here explained are a process in a case that due to movement or expansion of a virtual area the virtual area overlaps another virtual area, and a process in a case that writing arises to a virtual area not mapped to any physical areas.

Figure 2:
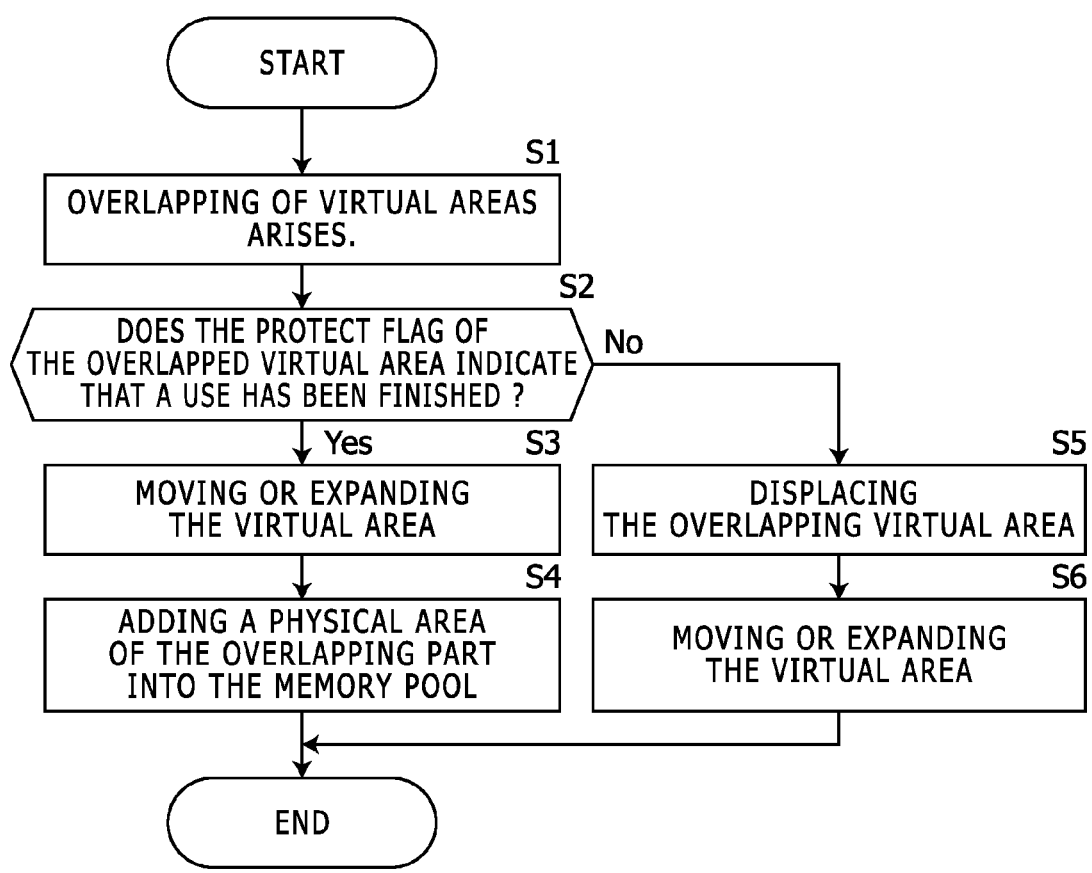
FIG. 2 shows a flowchart that explains a behavior of the image processing apparatus in a case that a virtual area in its expansion or movement overlaps another virtual area.
Figure 3A:
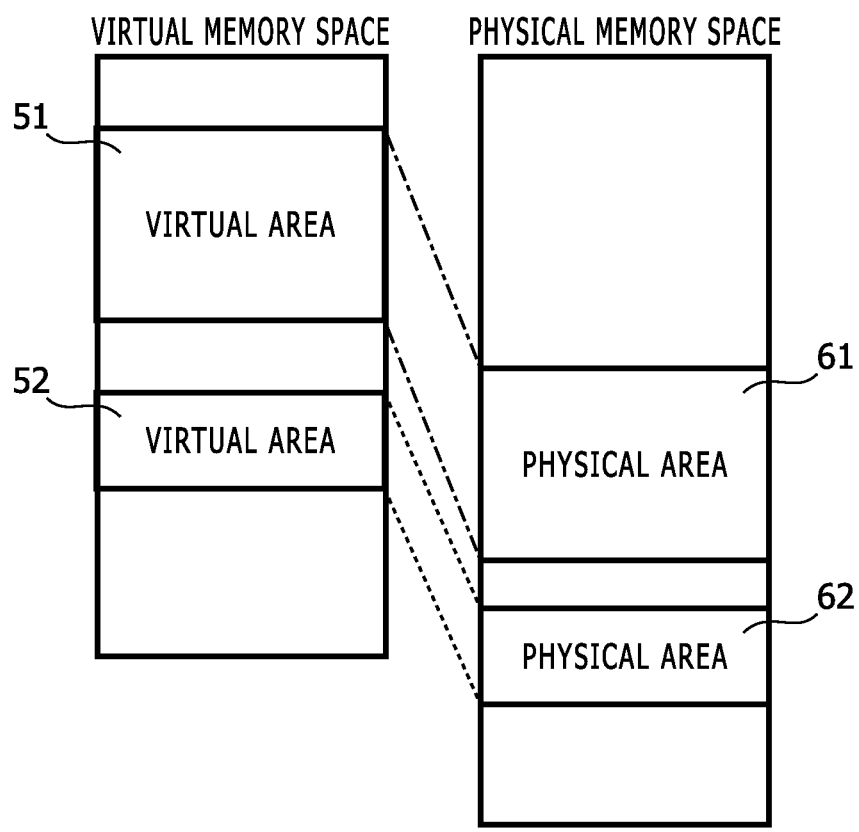
FIG. 3A shows a diagram that explains an example of movement of a virtual area among virtual areas allocated in a RAM shown in FIG. 1 (a status before the movement)
Figure 3B:
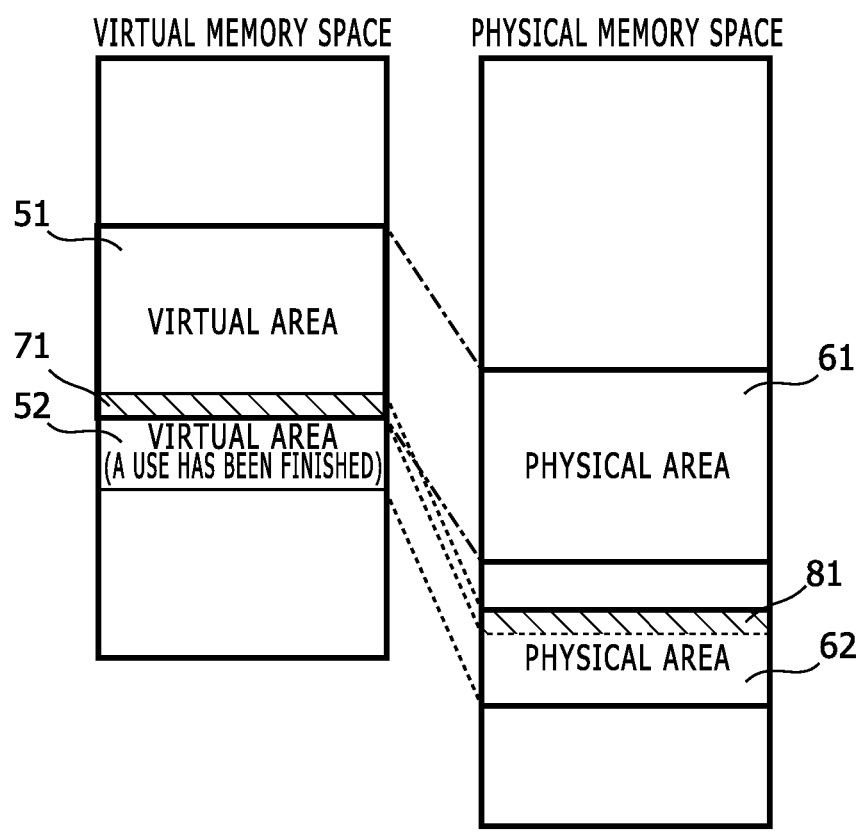
FIG. 3B shows a diagram that explains an example of movement of a virtual area among virtual areas allocated in a RAM shown in FIG. 1 (a status after the movement)

(a) A Case that Due to Movement or Expansion of a Virtual Area the Virtual Area Overlaps Another Virtual Area FIG. 2 shows a flowchart that explains a behavior of the image processing apparatus in a case that a virtual area in its expansion or movement overlaps another virtual area. FIG. 3A and FIG. 3B show diagrams that explain an example of movement of a virtual area 51 among virtual areas 51 and 52 allocated in the RAM 12 shown in FIG. 1. FIG. 3A indicates a status before the movement of the virtual area 51, and FIG. 3B indicates a status after the movement of the virtual area 51.

The memory area managing unit 22 sets a protect flag when allocating virtual area 51 or 52 in accordance with a request from the application 21. As an initial value, the protect flag has a value (e.g. 1) indicating that a use has not been finished. Upon detecting that the application 21 that allocated the virtual area 51 or 52 finished a use of the virtual area 51 or 52, for example, on the basis of an explicit notification from the application 21, the memory area managing unit 22 changes the value of the protect flag of the virtual area 51 or 52 to a value (e.g. 0) indicating that a use has been finished.

Further, the memory area managing unit 22 determines whether a part or all of the virtual area 51 would overlap another virtual area 52 due to expansion or movement of the virtual area 51 according to a request from the application 21 or not.

If the memory area managing unit 22 determines that the virtual area 51 would overlap another virtual area 52 due to its expansion or movement (in Step S1), the memory area managing unit 22 identifies whether the value of the protect flag of the overlapped virtual area 52 indicates that a use of the virtual area 52 has been finished (in Step S2).

If the value of the protect flag of the overlapped virtual area 52 indicates that a use of the virtual area 52 has been finished, as shown in FIG. 3B, the memory area managing unit 22 allows the movement or the expansion of the virtual area 51, and performs the movement or the expansion of the virtual area 51 (in Step S3).

After the movement or the expansion of the virtual area 51, the memory pool managing unit 23 adds a physical area 81 corresponding to an overlapping part 71 of the virtual area 51 and the virtual area 52 into a memory pool in order to map the physical area 81 to all or a part of another virtual area (in Step S4). Thus, after the movement or the expansion of the virtual area 51, since this physical area 81 does not have any corresponding virtual areas, this physical area 81 is added in the memory pool and will be reused.

FIG. 4 shows a diagram that indicates an example of a memory pool table managed by a memory pool managing unit 23 in FIG. 1. In a memory pool table, the memory pool managing unit 23 registers and keeps a top physical address and a size (or a top physical address and an end physical address) of each physical area 81 added in the memory pool. It should be noted that the memory pool table is stored in a predetermined physical area in the RAM 12.

Contrarily, if in Step S2 the value of the protect flag of the overlapped virtual area 52 does not indicate that a use of the virtual area 52 has been finished, the memory area managing unit 22 moves the virtual area 52 to a free area, and remaps the virtual area 52 to the physical area 62 after the movement (in Step S5). Afterward, the memory area managing unit 22 allows the movement or the expansion of the virtual area 51, and performs he movement or the expansion of the virtual area 51 (in Step S6).

As mentioned, in a case that the virtual area 51 would overlap another virtual area 52 due to movement or expansion of the virtual area 51, if a use of the virtual area 52 has been finished, the movement or the expansion of the virtual area 51 is immediately performed and the physical area 81 corresponding the overlapping part 71 is added in the memory pool.

Figure 5:
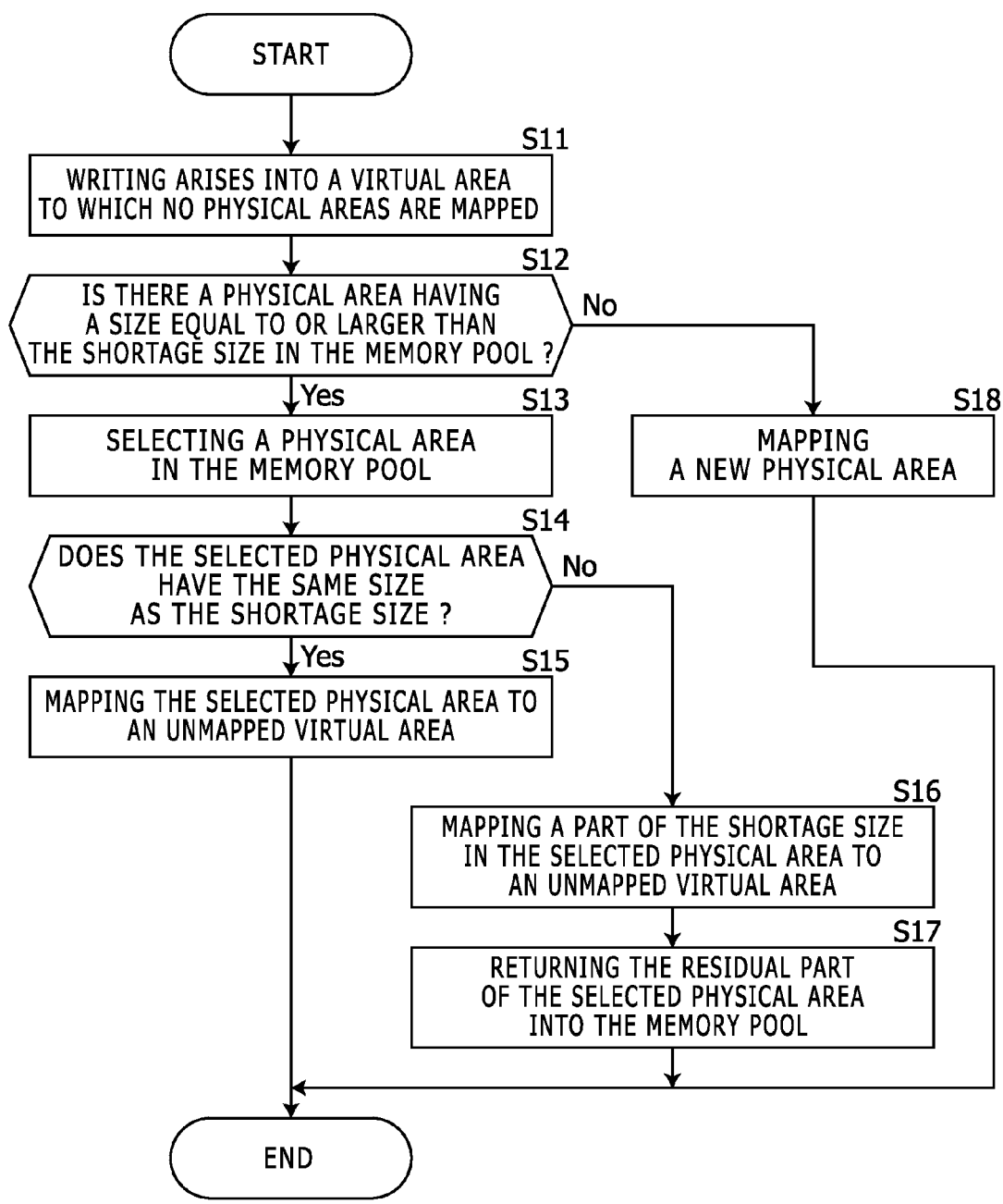
FIG. 5 shows a flowchart that explains a behavior of the image processing apparatus in a case that data writing arises to a virtual area not mapped to any physical areas.
Figure 6A:
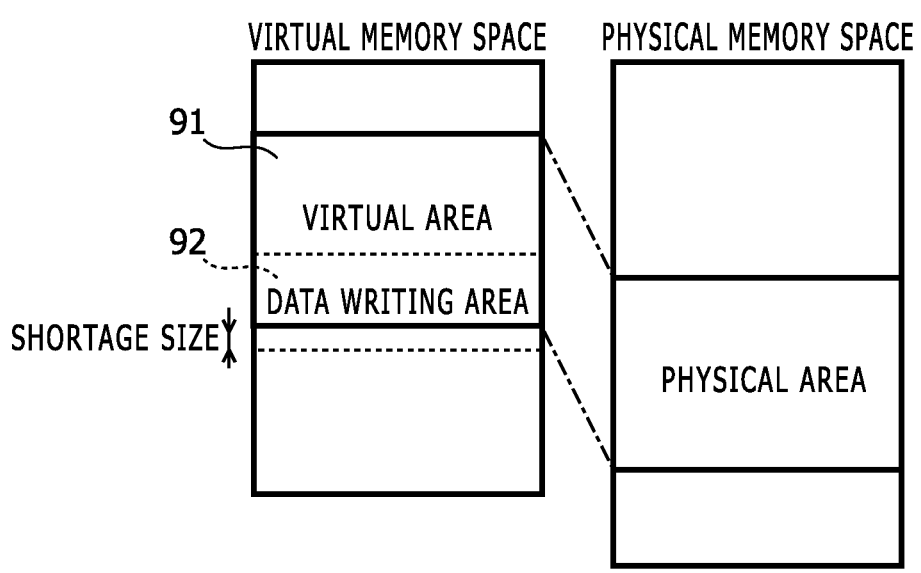
FIG. 6A shows a diagram that explains an example of data writing to a position outside of virtual areas mapped to physical areas in the RAM shown in FIG. 1 (an example of a position relationship between the virtual area mapped to a physical area and the data writing area)
Figure 6B:
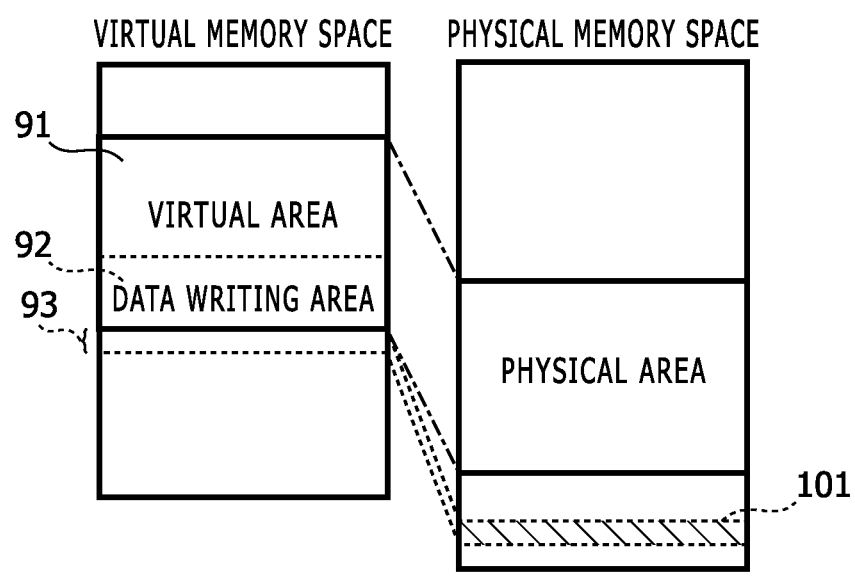
FIG. 6B shows a diagram that explains an example of data writing to a position outside of virtual areas mapped to physical areas in the RAM shown in FIG. 1 (an example of mapping a physical area to a part of a data writing area in the outside of the virtual area)
Figure 6C:
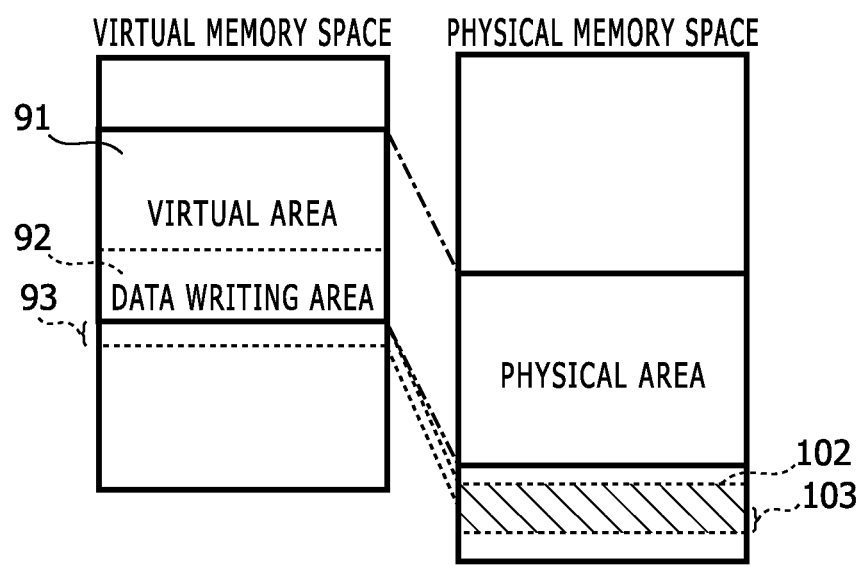
FIG. 6C shows a diagram that explains an example of data writing to a position outside of virtual areas mapped to physical areas in the RAM shown in FIG. 1 (another example of mapping a physical area to a part of a data writing area in the outside of the virtual area).

(b) A Case that Writing Arises to a Virtual Area not Mapped to any Physical Areas FIG. 5 shows a flowchart that explains a behavior of the image processing apparatus in a case that data writing arises to a virtual area not mapped to any physical areas. FIGS. 6A to 6C show diagrams that explain examples of data writing to a position outside of virtual areas mapped to physical areas in the RAM 12 shown in FIG. 1. FIG. 6A indicates a position relationship between the virtual area 91 mapped to physical area and the data writing area 92, and FIG. 6B and FIG. 6C indicate mapping a physical area to a part of a data writing area 92 in the outside of the virtual area 91.

For example, as shown in FIG. 6A, if the memory area managing unit 22 detects data writing by the application 21 is data writing to a virtual area not mapped to any physical areas (in Step S11), the memory area managing unit 22 determines a size of physical area required for the data writing (i.e. a shortage size), refers to the memory pool table and determines whether or not a physical area having a size either equal to or larger than the shortage size is kept in the memory pool (in Step S12).

If a physical area having a size either equal to or larger than the shortage size is kept in the memory pool, the memory area managing unit 22 selects the physical area having a size either equal to or larger than the shortage size (in Step S13).

Here, for example, if there is a physical area having the same size as the shortage size, then the memory area managing unit 22 selects this physical area. If there are no physical areas having the same size as the shortage size, then the memory area managing unit 22 selects a physical area having a size larger than and nearest to the shortage size.

As shown in FIG. 6B, if the size of the selected physical area 101 is the same as the shortage size (in Step S14), the memory area managing unit 22 maps the whole selected physical area 101 to an unmapped virtual area 93 in the data writing area 92 (in Step S15). The memory pool managing unit 23 deletes the mapped physical area 101 in the memory pool table.

Contrarily, as shown in FIG. 6C, if the size of the selected physical area 102 is larger than the shortage size (in Step S14), the memory area managing unit 22 maps a part of the selected physical area 102 to an unmapped virtual area 93 in the data writing area 92 (in Step S16), and keeps a physical area 103 as its residual part in the memory pool (in Step S17). The memory pool managing unit 23 deletes the mapped physical area 102 in the memory pool table, and registers the physical area 103 as its residual part in the memory pool table.

It should be noted that in Step S12 if no physical areas having a size either equal to or larger than the shortage size are kept in the memory pool, the memory area managing unit 22 maps a new physical area to the unmapped virtual area 93 (in Step S18).

In this manner, when data writing arises to a virtual area not mapped to any physical areas, if there is a physical area kept in the memory pool as mentioned, such a physical area is reused.

As mentioned, in the aforementioned embodiment, the memory area managing unit 22 (a) sets a protect flag to each virtual area 51 or 52 allocated in the virtual memory space, the protect flag indicating whether a use of the virtual area has been finished or not, and (b) when a part or all of the virtual area 51 would overlap another virtual area 52 due to expansion or movement of the virtual area 51, allows the expansion or the movement of the virtual area 51 accompanying with overlapping the virtual area 52, if the protect flag of the virtual area 52 indicates that a use of the virtual area 52 has been finished. If the expansion or the movement of the virtual area 51 accompanying with overlapping the virtual area 52 is allowed by the memory area managing unit 22, the memory pool managing unit 23 adds a physical area 81 in a physical memory space corresponding to an overlapping part of the virtual area 51 and the virtual area 52 into the memory pool in order to map the physical area 81 to another virtual area.

Consequently, even if a virtual memory space is small, it is possible to reduce the frequency of remapping (or remapping and memory copy) due to expansion or movement of an allocated virtual area. In addition, usage efficiency of the physical memory space increases.

It should be noted that the aforementioned description has been presented for purposes of illustration and description, and is not intended to be exhaustive nor to limit the present invention.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

INDUSTRIAL APPLICABILITY

For example, the present invention is applicable to an image forming apparatus such as a printer or a multi function peripheral.

The invention claimed is:

1. A memory managing apparatus, comprising:
an application that allocates a virtual area in a virtual memory space required for performing an image process, and performs the image process;
a memory area managing unit that i) performs mapping the virtual area to a physical area in a physical memory space in accordance with a request from the application, ii) sets a protect flag to each of the virtual area in accordance with the request from the application, the protect flag indicating that a use of the virtual area by the application has been finished or not, iii when a part or all of a first virtual area would overlap a second virtual area due to expansion or movement of the first virtual area, allows the expansion or the movement of the first virtual area accompanying with overlapping the second virtual area if the protect flag of the second virtual area indicates that the use of the second virtual area has been finished, and iv) when the part or all of the first virtual area would overlap the second virtual area due to the expansion or the movement of the first virtual area, does not allow the expansion or the movement of the first virtual area accompanying with overlapping the second virtual area if the protect flag of the second virtual area does not indicate that the use of the second virtual area has been finished; and
a memory pool managing unit that i) adds the physical area corresponding to an overlapping part of the first and the second virtual areas into a memory pool in order to map the physical area to another virtual area, if the expansion or the movement of the first virtual area accompanying with overlapping the second virtual area is allowed by the memory area managing unit, ii) manages a memory pool table that stores either a top physical address and a size or the top physical address and an end physical address of the physical area in the memory pool, and iii) selects the physical area having the size either equal to or larger than the size of said another virtual area on the basis of either the top physical address and the size or the top physical address and the end physical address in the memory pool table, wherein,
if the memory area managing unit i) detects data writing by the application, the data writing being to the virtual area that is not mapped to any physical areas, ii) determines a shortage size for the data writing, and iii) determines whether or not a physical area having the size either equal to or larger than the shortage size is kept in the memory pool by referring the memory pool table,
if the physical area having the size either equal to or larger than the shortage size is kept in the memory pool, the memory area managing unit selects the physical area having the size either equal to or larger than and nearest to the shortage size,
if the size of the selected physical area is the same as the shortage size, the memory area managing unit maps the whole selected physical area to an unmapped virtual area, and the memory pool managing unit deletes the mapped physical area in the memory pool table,
if the size of the selected physical area is larger than and nearest to the shortage size, the memory area managing unit maps a part of the selected physical area to the unmapped virtual area, and keeps the physical area as its residual part in the memory pool, and the memory pool managing unit deletes the mapped physical area in the memory pool table, and registers the physical area as its residual part in the memory pool table, and
if no physical areas having the size either equal to or larger than and nearest to the shortage size are kept in the memory pool, the memory area managing unit maps a new physical area to the unmapped virtual area.

2. The memory managing apparatus according to claim 1, wherein the memory area managing unit manages the virtual memory space and the physical memory space using a paging system, and sets the protect flag to each page in the paging system.

* * * * *